United States Patent [19]

Standal

[11] 4,172,556
[45] Oct. 30, 1979

[54] SELF-PROPELLED LINEAR IRRIGATION SYSTEM

[76] Inventor: Norman S. Standal, Star Rte., Bliss, Id. 83314

[21] Appl. No.: 808,454

[22] Filed: Jun. 20, 1977

Related U.S. Application Data

[63] Continuation of Ser. No. 609,343, Sep. 2, 1975, Pat. No. 4,036,436.

[51] Int. Cl.² .................. A01G 25/09; B05B 3/18
[52] U.S. Cl. ........................... 239/1; 239/183; 239/212; 137/344
[58] Field of Search ............. 239/177, 183, 184, 186, 239/187–189, 212, 1; 137/344

[56] References Cited

U.S. PATENT DOCUMENTS

| Re. 26,285 | 10/1967 | Stafford | 239/212 |
|---|---|---|---|
| 3,444,941 | 5/1969 | Purtell | 239/183 X |
| 3,463,175 | 8/1969 | Rogers | 239/184 X |
| 3,583,428 | 6/1971 | Cornelius | 239/212 X |
| 3,592,220 | 7/1971 | Reinke | 239/212 X |
| 3,606,161 | 9/1971 | Paul | 239/177 |
| 3,679,135 | 7/1972 | Grosch | 239/183 |
| 3,707,164 | 12/1972 | Clemons | 137/344 |
| 3,729,016 | 4/1973 | Von Linsowe | 239/212 X |

FOREIGN PATENT DOCUMENTS 434918  11/1974  U.S.S.R. .................. 239/183

Primary Examiner—Robert B. Reeves
Assistant Examiner—Andres Kashnikow
Attorney, Agent, or Firm—Trask & Britt

[57] ABSTRACT

A self-propelled linear irrigation system including an elongated line move having a plurality of sprinkler outlets along its length, a plurality of mobile supports spaced along a line move and a main tractor having water pipe outlet engaging member and a fluid powered prime mover is disclosed. The propulsion system comprises a pneumatic system involving a main compressed air line and compressed air storage tank on the main tractor and each mobile support. The tractor of the irrigation system has automatic coupling members for coupling to the water supply and compressed air supply and automatically propels itself from one compressed air and water station to the next compressed air and water station along a main supply line. The main tractor has a main rigid central section having connecting members for connecting the tractor with the elongated line move and a first and second valve car, each having extensible propulsion members connecting each valve car to the main section. The tractor also has a drift correction system to maintain the tractor and line move traveling along a straight course, parallel to the main water supply line.

4 Claims, 16 Drawing Figures

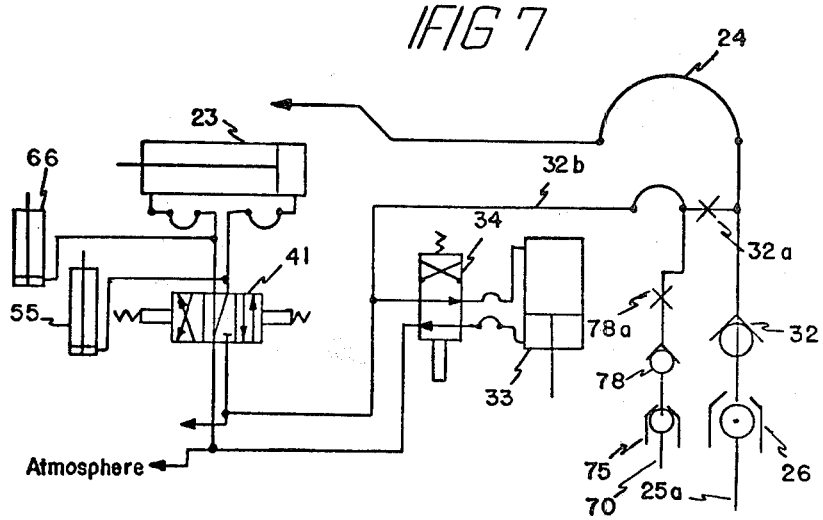
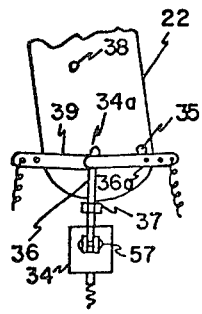
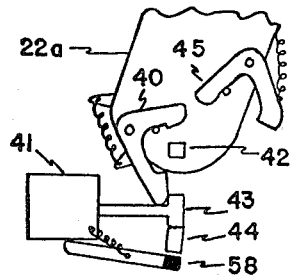
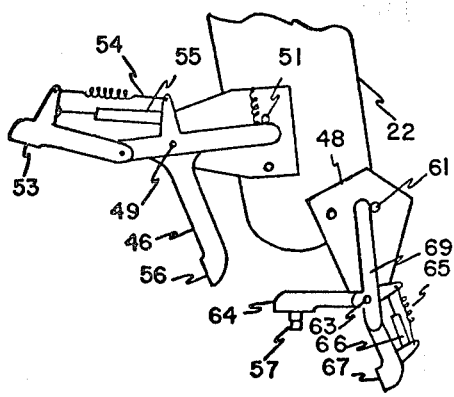
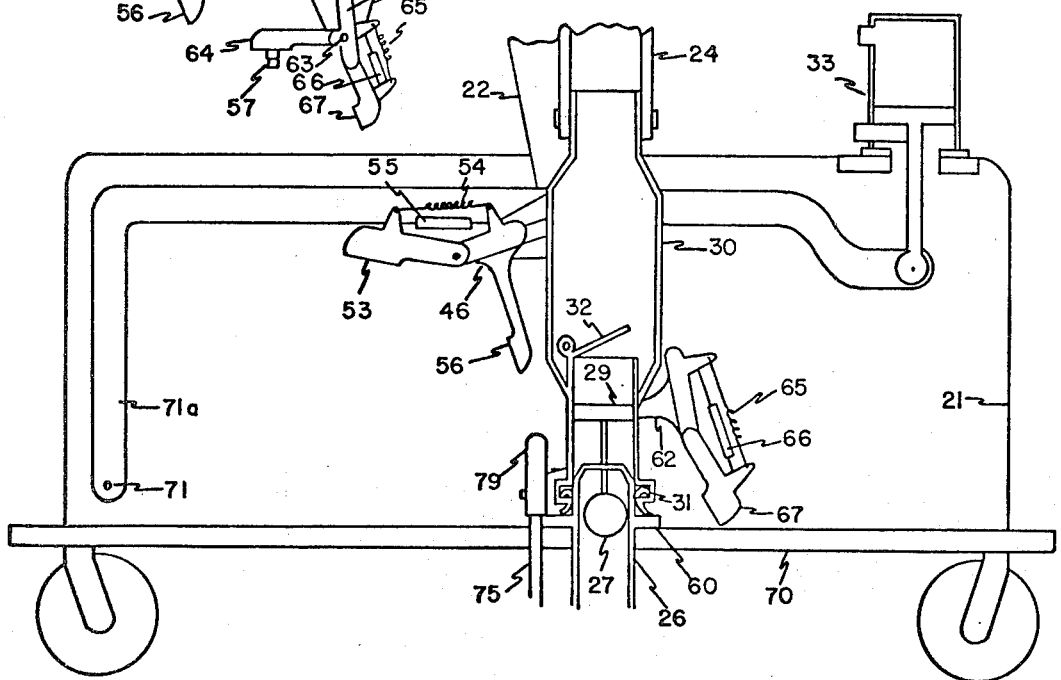

SELF-PROPELLED LINEAR IRRIGATION SYSTEM

This is a continuation of application Ser. No. 609,343 filed Sept. 2, 1975, issued on July 19, 1977 as U.S. Pat. No. 4,036,436.

BACKGROUND OF INVENTION

Sprinkler-type irrigation systems have become an important part of agriculture in semi-arid regions. Numerous types of automatic sprinkler-type irrigation systems have been utilized, although the basic types are generally a pivot-type sprinkler and a linear-type sprinkler. The pivot sprinklers are fixed to a pivot and rotate a line move containing sprinkler heads around the pivot. One significant disadvantage of a pivot-type sprinkler is that it sprinkles a circular area while most fields are square or rectangular, thereby failing to water at least 20 percent of the arable portion of the field. Pivot-type sprinklers have advantages in that the sprinkler is fixed at one point and cannot readily become displaced and can be readily self-propelled and fully automated so that very little attention is required. Linear-type sprinklers are particularly efficient in irrigating 100 percent of the available arable area, however, they have been more difficult to automate since the whole sprinkler system travels in relation to the water supply system, and has generally been more difficult to propel and maintain in alignment, particularly in hilly or uneven terrain.

STATE OF THE ART

The following patents illustrate many of the techniques which have been devised to improve sprinkler-type irrigation systems.

U.S. Pat. No. 3,444,941 of Purtell describes a linear-type sprinkler apparatus involving a self-propelled tractor which propels itself by winch means along a cable laid along the main water supply. The tractor moves from one riser to another automatically, although the water supply to the line move is discontinued during movement of the tractor. The line move is connected to the tractor by a flexible hose. The line move does not possess a guidance system to prevent the line move from either moving away from or toward the tractor. Movement toward the tractor could result in binding of the line move. Power is supplied to the winch by a hydraulic motor fed from a small hose which must be dragged along with the tractor as it moves. Since the tractor is disconnected from the main water supply during movement, it is necessary to have a supplemental power supply.

U.S. Pat. No. 3,583,428 to Cornelius describes a linear sprinkling-type irrigation system which has a main tractor powered by a gasoline engine which drives the irrigation system by winch means along a cable. The main tractor drags a flexible pipe as the main water supply which feeds the line move. Individual tires on the line move contain water driven motors to propel the line move across a field. Bending of the water line stretched across the line move is responsible for maintaining the alignment of the line move. Drift caused by hilly terrain is not corrected by this type of alignment mechanism.

U.S. Pat. No. Re. 26,285 to Stafford relates to a linear-type irrigation system wherein a telescoping truck travels parallel to a main water supply system. Water flow is interrupted during disengaging and reengaging of the coupler of the truck to a valve of the main water supply line. The truck is provided with telescoping pipes so that the line move may move forward while the coupling of the truck is coupled to a particular water supply valve. After the line move is moved to its maximum extent, the coupling of the truck is disengaged from one water supply valve and moved to the next valve closest to the line move. The moving of the coupling of the truck from one valve to another is apparently accomplished manually. Also, the system appears to provide no means for detecting or correcting for drift or end thrust.

U.S. Pat. No. 3,592,220 to Reinke relates to a linear-type sprinkler irrigation system which utilizes a special main water supply line of a zipper-like structure wherein a special water pickup shoe of the main truck engages the water line. The alignment of the line move is maintained by spaced, notched uprights anchored to the ground and spaced along the travel of each tractor and tower to engage lugs on the wheels of these devices to thereby synchronize rotation of each wheel.

U.S. Pat. No. 3,463,175 to Rogers discloses a linear-type sprinkler irrigation system wherein a continuous supply of water is supplied to the line move by a pair of hinged legs which step, in effect, from one riser along the main water line to another riser. The hinged legs ride along a steel plate attached on or at the top of the main water supply line. The sprinkler system is automatically coupled to the water line risers. The line move is connected by flexible pipe to the hinged unit moving along the water supply line. No provision is made to compensate for drift of the line move, and a flexible interconnection between the line move and the hinged system appears inherent inasmuch as the hinged unit has movement which does not match the movement of the line move.

U.S. Pat. No. 3,707,164 to Clemons describes an electrical system which compensates for drift of the line move by retarding the speed of a tractor in the line move to cause the line move to either lag or lead the main tractor. The system provides for pickup of water from an irrigation ditch along one edge of the field and uses feeler-rollers in contact with the ditch to determine the lateral end thrust on the system.

U.S. Pat. No. 3,729,016 to Von Linsowe describes a linear-type irrigation system having spaced-apart outlet couplings and a mobile irrigator adapted to travel adjacent to the water supply line and to couple a pair of movable inlet couplings therewith. The inlet couplings of the apparatus walk on the irrigator as the irrigator advances along the supply. The coupling and decoupling of the apparatus with the main supply line is automatic. The apparatus does not compensate for end drift of the line move and does not use the risers from the main supply line as anchors to which force can be applied to move the tractor.

U.S. Pat. No. 3,606,161 to Paul relates to a self-propelled sprinkling apparatus of the pivot type wherein an air operated drive means is provided on each of the towers to provide the towers and pipe around the central pivot point. Release valves on each of the towers are used to control the rate of motion of the tower so as to maintain the alignment of the towers in the system. The pivot-type sprinkler system disclosed in Paul maintains a constant contact at one end of the line move with the water supply and with the compressed air supply. The system does not have to provide for end drift since it is anchored at one end and cannot move in that direction.

OBJECTS OF THE INVENTION

It is a principal object of the instant invention to provide a self-propelled linear sprinkling system which provides a continuous flow of water from its sprinklers while automatically coupling to a main water supply line.

It is an object of the instant invention to provide a self-propelled linear irrigation system having a compressed air prime mover for the main tractor and for each mobile support of the line move whereby the system can be moved without direct connection to a source of energy.

Another object of the instant invention is to provide a propulsion system for a linear irrigation system which is independent of the availability of water.

A further object of the instant invention is to provide a linear irrigation system which is readily adaptable to presently installed underground or overground water pipe distribution lines.

Also, an object of the invention is the provision of a system which is capable of guiding upon the main water supply pipe.

Other objects of the invention are to provide a linear irrigation system in which the prime mover energy transmitting medium is safe and non-injurious to farm crops, to provide a system which can move without spraying, to provide a system which stores energy, and to provide a system which adjusts for end thrust of the line move.

SUMMARY OF THE INVENTION

A self-propelled linear irrigation system propelled by a high pressure fluid, pneumatic or hydraulic, propulsion system has now been invented. A main tractor and a plurality of mobile supports spaced along a line move are propelled hydraulically or pneumatically wherein energy storage means is provided so that the system can be propelled while disconnected from any supply line. The main tractor preferably has water pipe outlet engaging means, and compressed air outlet engaging means when propelled pneumatically, which preferably engage automatically. The main tractor travels along a linear guide system, which may be the main water supply line and/or a compressed air line or alternatively, a separate guide means such as a taut cable.

A pneumatically propelled sprinkling system has a number of advantages over hydraulically propelled sprinkling systems, particularly where the hydraulic system is water. Although water is generally available for any sprinkling system, the use of water in cylinders and the like to provide a hydraulic prime mover presents a significant corrosion problem, may lower the sprinkling pressure and cannot be stored in a high energy form so that the sprinkling system can be moved when disconnected from the water supply. This may present a problem in the early spring or late fall when frequently there is no irrigation water available. Also, a pneumatically powered sprinkling system can be moved without turning the water on, thus the sprinkler system may be moved when it is desired not to irrigate the land.

In a preferred embodiment of the instant invention, a self-propelled linear irrigation system is provided with a main tractor for traveling along the main water supply line. The tractor has a rigid, central section supported on wheels or other transport means, with interconnecting means between the central section and a line move. The tractor further comprises a first and second valve car means, each supported on wheels or slides and each having automatic coupling means to couple each valve car to a vertical water pipe riser. First and second valve car means are each connected to the main central section of the tractor by a pair of hinged arms which may extend and contract by a pneumatic or hydraulic powered piston and cylinder or other means. The hinged arms preferably extend vertically and may be fairly large, for example, each arm may be from four to twelve feet in length or longer. Each valve car has coupling means to couple the valve car to a riser, thus as the arms extend or contract, the valve car moves the central section of the tractor into a position closer to or farther away from said valve car. In this feature of automatically coupling and decoupling to provide a continuous flow of water, the prime mover for the tractor, including valve cars may be an electric motor or a fuel burning engine, although the hydraulic or pneumatic system is preferred.

The instant invention is particularly advantageous inasmuch as it also provides compensation for end thrust which tends to displace the tractor from its preselected path. The end thrust mechanism of the instant invention provides correcting adjustment whether the end thrust results because the line move has preceded the tractor or is lagging the tractor or because of hilly terrain and whether said end thrust of line move is towards or away from the tractor.

DESCRIPTION OF THE DRAWINGS

The invention described herein is illustrated by the following drawings:

FIG. 7 is a diagram of the fluid system of a valve car;

FIG. 8 is a perspective view of the coupler cylinder valve;

FIG. 9 is an elevational view of the hinged arm cylinder valve;

FIG. 10 is an elevational view of the riser locating mechanism;

FIG. 11 is an elevational, longitudinal, cross sectional view through the center of a valve car;

DESCRIPTION OF PREFERRED EMBODIMENTS

Figure 14:
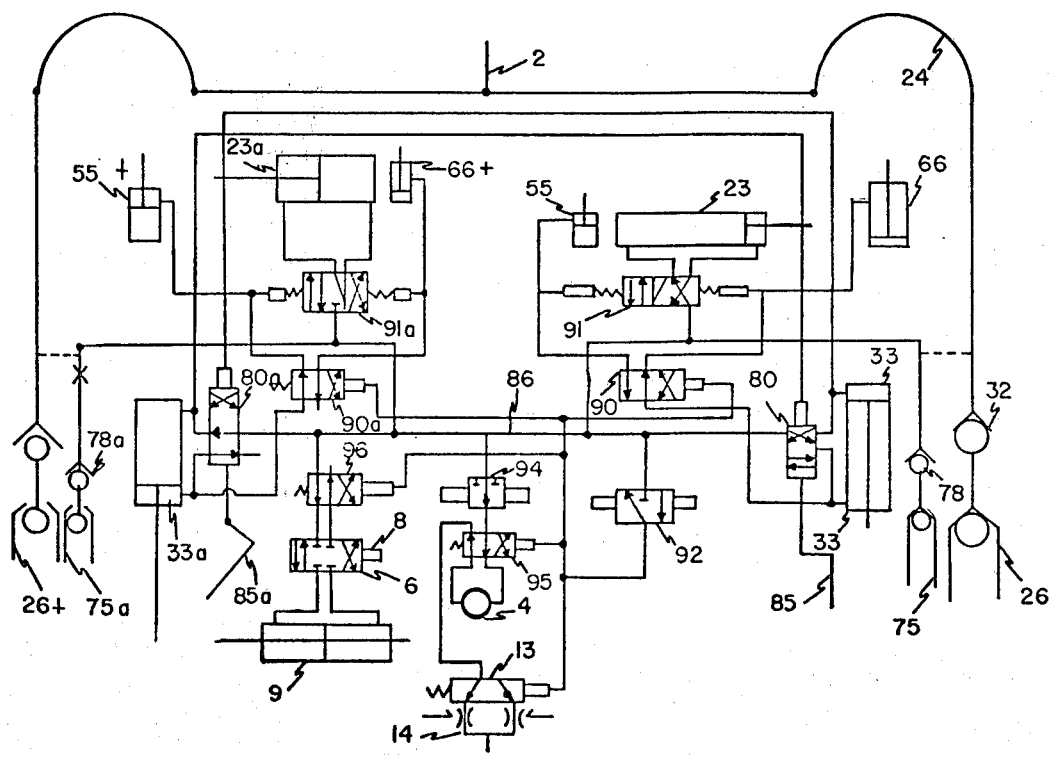
FIG. 14 is a schematic illustration of the coupler system of the device illustrated in FIG. 1 wherein the central portion of the tractor is self powered and sequencing is controlled pneumatically or hydraulically.
Figure 15:
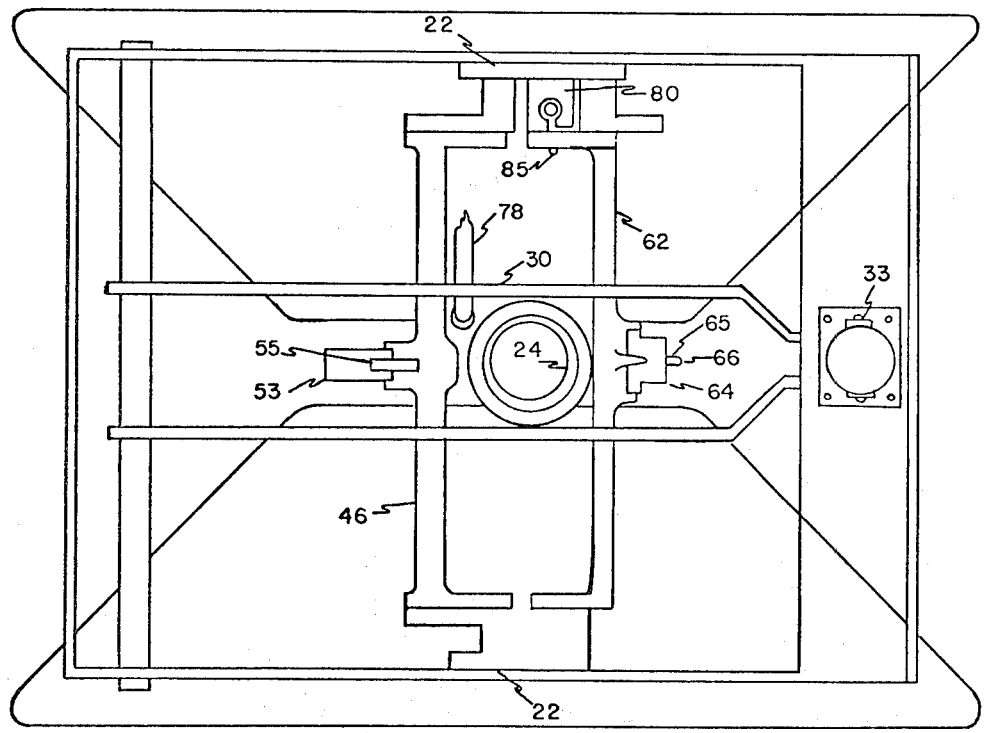
FIG. 15 is a lateral cross sectional view of the valve car illustrating an alternative valve location used when the unit is sequenced pneumatically or hydraulically.

The sprinkling apparatus shown in FIGS. 1 through 12 is a mechanical device powered by a fluid, preferably either air or water, with sequencing of the valve car controlled mechanically by the hinged arms, specifically shown in FIGS. 8 and 9. Alternatively, the movement or sequencing of the valve cars can be controlled by pneumatic or hydraulic valves as shown in FIGS. 14 and 15.

Figure 1:
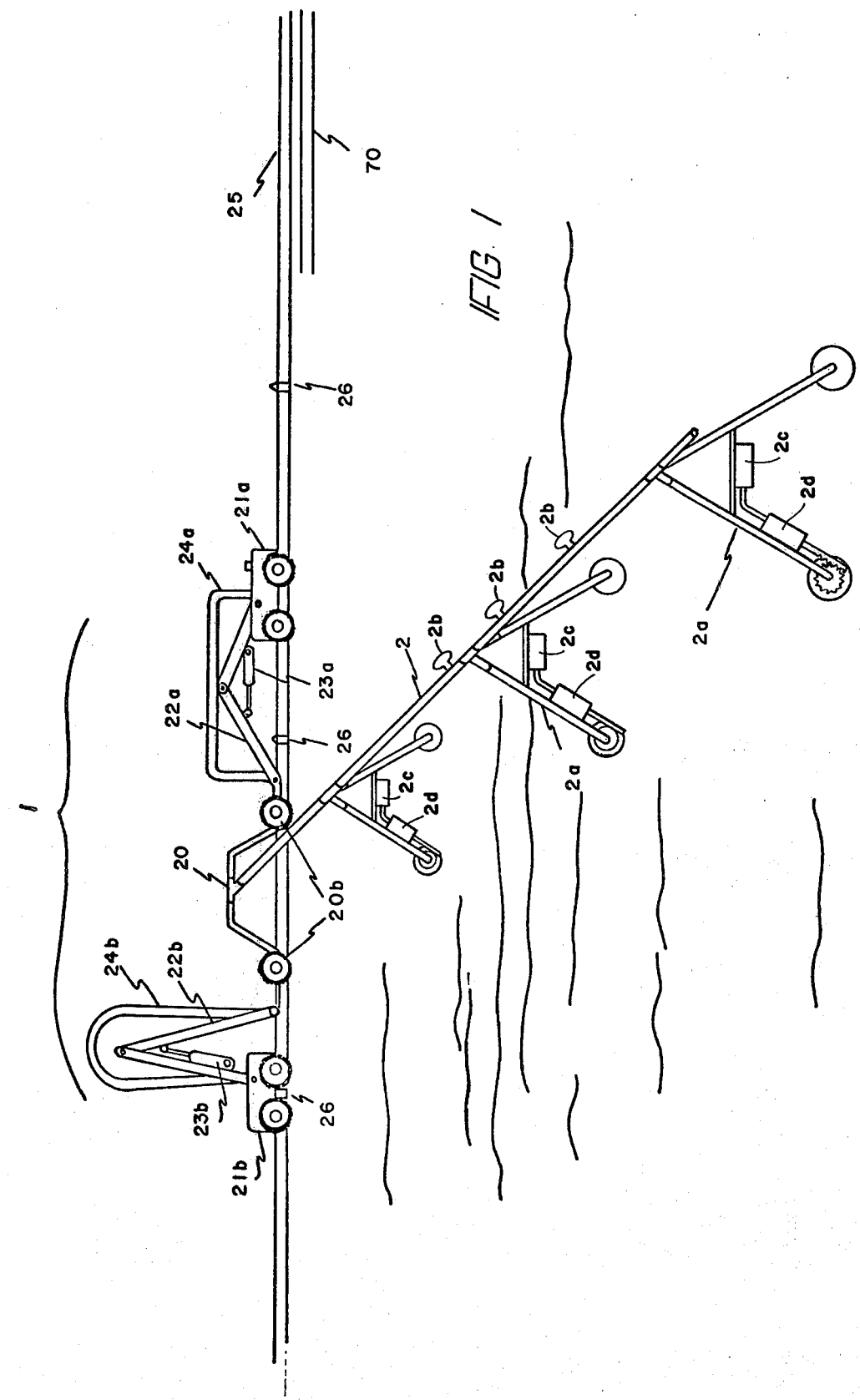
FIG. 1 is a perspective view of the sprinkler system located in a typical field.

The device illustrated in FIG. 1 is a preferred device for accomplishing the purposes of this invention. A tractor 1 comprising a number of subcomponent parts is attached through a central rigid section 20 to a line move 2 which is a typical sprinkler line move having multiple mobile supporting towers 2a carrying a sprinkler line 2b. Each mobile tower is illustrated with a pneumatic storage tank 2c attached. The storage tank 2c is connected to a pneumatic cylinder 2d which drives the wheels of each mobile support tower 2a. The mechanism of connecting the line move 2 to the rigid central portion of the tractor 20 is illustrated in more detail in FIGS. 2 through 4. The central rigid section of the tractor preferably has a mid-portion 20a which is at the same height as the sprinkler pipe 2b. The central portion of the tractor is supported by wheels 20b, which may be either drive wheels or idler wheels. The central portion of the tractor is connected through extensible means to valve cars 21a and 21b. In the device illustrated, the extensible means comprise a pair of elongated, hinged arms 22a and 22b. The hinged arms are caused to expand and contract by fluid prime movers 23a and 23b which are typically a cylinder, piston and rod. The whole tractor moves along a linear guide which may be the water supply line 25, a compressed air line 70 or a cable or guide specifically installed for the purpose of being a guide. The guide is preferably the water supply line or the compressed air line if the system is powered pneumatically. Risers 26 are illustrated as coming from a main supply line. The valve cars 21a and 21b are designed to couple to said risers to supply water to the sprinkling system through flexible lines 24a and 24b or other means which connects valve cars 21a and 21b with the main central section 20 of the tractor.

In operation the tractor follows along guide 25 to interconnect with risers 26 at a relatively constant rate with the line move attached, supplying water to and guiding the line move. Direction and rate of travel can be controlled by the tractor or the tractor rate and direction may be controlled by the line move, depending upon the control system used.

The valve cars 21a and 21b, following guide 25, advance to a riser, clamp on to the riser 26, open the riser valve and let the water flow from the main supply line, up through the riser and valve car connector, then through the connecting hose 24a to the central portion of the tractor and through the central portion 20a to the line move 2 to be distributed over the field in a conventional manner. The connecting hoses 24a and 24b may be eliminated, if desired, and arms 22a and 22b constructed of tubular members which have sealed, hinged joints so that the hinged arms may serve as a water conduit.

Each valve car automatically advances independently and is correlated with the other so that when one car is advancing to the next riser, the other is supplying water to the sprinklers of the line move in a continuous, uninterrupted flow. At a certain point in the operating cycle, both couplers are connected to adjacent risers. When the central portion of the tractor moves adjacent the front valve car 21a, the coupler decouples and the front car extends out ahead of the central portion of the tractor to its greatest reach, while the rear coupler continues to supply water to the sprinkler system. Before the rear valve car 21b stretches to its maximum reach from the central portion of the tractor, the front car reaches and couples to the next riser. Both couplers are again coupled to risers and supplying water to the sprinkler, only they now span a two riser spacing, i.e., a riser lies between the two risers to which the valve cars are coupled. When the central portion of the tractor stretches the rear valve car to its maximum reach, it decouples and closes to its minimum reach. As the central portion of the tractor approaches the front car, the rear car reaches and attaches to the intervening riser. Thus, the valve cars are again coupled to adjacent risers and the sprinkler has advanced one riser spacing.

Figure 2:
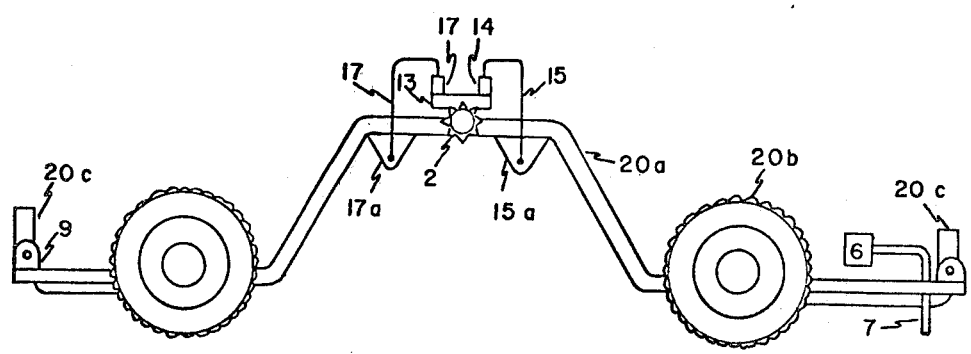
FIG. 2 is an elevational view of the central portion of the tractor.
Figure 3:
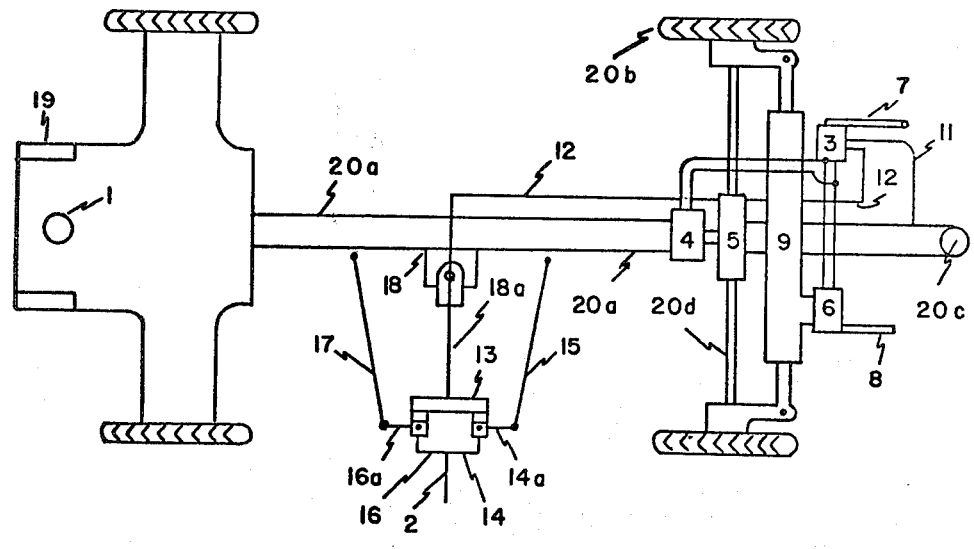
FIG. 3 is a plan view of the central portion of the tractor.
Figure 4:
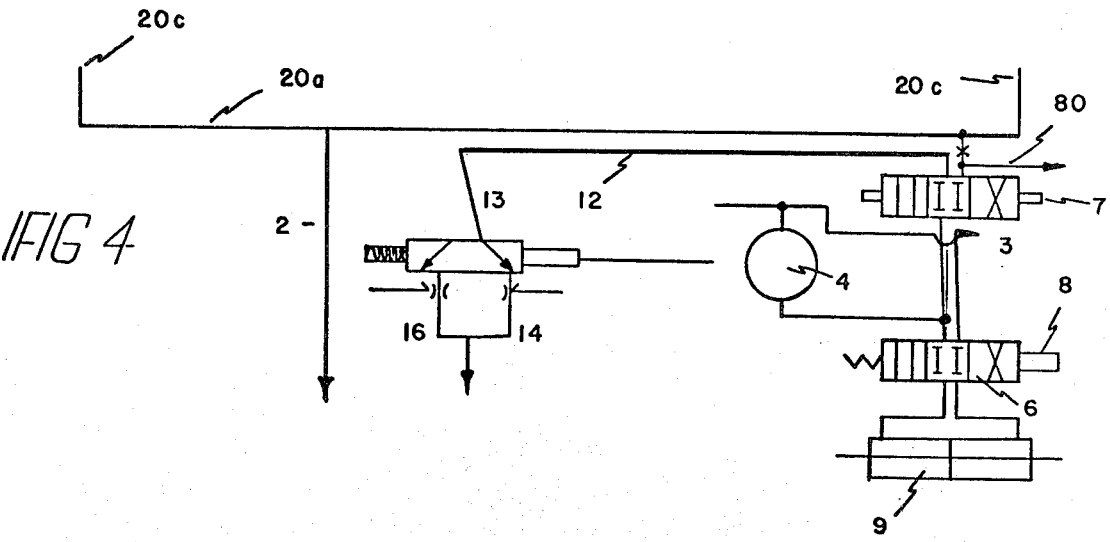
FIG. 4 is a diagram of the fluid system of the central portion of the tractor.

FIGS. 2, 3 and 4 relate to the central rigid portion of the tractor. The pipe framework 20a of the central rigid section 20 of the tractor shown in FIGS. 2 and 3 receives water from the valve cars (see FIG. 1) by a hose 24 or other conduit means (see FIG. 1) connected to the upturned ends 20c of the pipe framework. Water then passes through a "T" between pipe 20a and pipe 2 and then through pipe 2 to the sprinklers associated with the line move.

The central section of the tractor is preferably symmetrical in that both ends are constructed in the same fashion so that the tractor may move in either direction. Only one end of the rigid central portion of the tractor is detailed for simplicity purposes. The wheels 20b may be undriven or driven by hydraulic motor 4 and gear box, drive shaft and universal joint 5 (See FIG. 3). Pressurized water for the hydraulic motor 4 is obtained from pipe 20a through hose 11 and four-way reversing valve 3. The wheels may also be driven by compressed air as is illustrated hereinafter. The low pressure discharge water from motor 4 is piped through reversing valve 3, then through line 12 to direction valve 13 and travel speed control valves 14 and 16, and then discharged into the field (See FIGS. 3 and 4). The position of direction valve 13 is determined by which direction the sprinkler is travelling.

An operating lever 8 follows the linear guide means 25, which may be a cable, pipe ditch, or other guide means, to actuate a four-way valve 6 which steers the wheels by controlling the fluid cylinder 9. At the end of the field the tractor is either shut off by a stop, such as posts set in the ground, positioned to contact lever 7 and shift valve 3 to the center off position, thus stopping the tractor travel, or, by shifting valve 3 to the reversing position and reversing the direction of the travel of the unit, and by changing the setting of direction valve 13 and changing the steering and travel throttle controls to accommodate the new direction.

The rate at which the linear sprinkler system travels over the field and consequently the amount of water applied to the field in one pass is preferably preset by setting the speed of the first mobile support along the line move. Each subsequent mobile support maintains the alignment of the pipe it supports in a manner which is well known in the art. Thus, the full length of the sprinkler line move acts as a rigid unit. In FIGS. 2 and 3, pipe 2 is connected to pipe frame 20a by a hose coupling inside a steel yoke-type universal joint 18, allowing 18 to swivel in all directions but preventing end movement between pipes 2 and pipe 20a. The tractor preferably matches the speed of the first tower and normally maintains pipe 2 at right angles to pipe 20a by the action of valve 14 and arm 15 when traveling to the right and valve 16 and arm 17 when traveling to the left. The rigid central section pipe 20a is connected to the axle means 20d of wheels 20b by bearing means so that the pipe can rotate, i.e., swing laterally, with regard to the axles 20d. The rigid central section 20a is free to rotate in relation to axles 20d, therefore, a certain amount of lateral movement is tolerated at the point at which pipe 2 connects to the mid-portion 20a of rigid central section 20 of the tractor.

This lateral movement, which may be caused by the line move traveling along a hillside elevated above the tractor, would tend to put a substantial end thrust towards the tractor, is sensed by valves 14 and 16 due to their operating rods 15 and 17 being anchored below the pivot point of joint 18. Valve 14 controls the end thrust drift of line move 2 while the tractor is moving in one direction while valve 16 performs a similar function when the tractor moves in an opposite direction along the guide.

The tractor traveling to the right and pipe 2 drifting toward the tractor could, in fact, overturn the tractor. This end thrust on the central rigid section 20 has the effect of causing compression on arm 15, thus increasing the opening of throttle valve 14, thereby increasing the speed of the tractor, causing it to travel ahead of the first mobile tower. As illustrated in FIG. 2, both arms 15 and 17 are connected to the rigid central section 20 at points 15a and 17a at a lower position than the connection of such arms to valves 14 and 16. Tension on arm 15, or on arm 17, reduces the opening of the corresponding throttle valve 14 or 16 depending upon direction of travel of the tractor, thus slowing down the tractor.

Tension on arm 15, for example, can be caused while the tractor is traveling to the right in FIG. 2 whenever the line move drops behind the tractor or whenever the line move is drifting away from the tractor. In either instance, the slowing of the tractor allows the line move to catch up, thereby decreasing the angle between the line move and the tractor.

Thus, by locating arms 15 and 17 to connect to 20a at points 15a and 17a at points forward and below universal joint 18 and the upper connection of the arms to valves 14 and 16 permit one throttle valve for each direction of travel of the tractor to compensate both for end drift of the line move and for forward and rearward misalignment of the line move in relation to the tractor.

Universal joint 18 may comprise a slip-joint whereby the pipe 18a between valve 13 and joint 18 comprises concentric sections whereby one may slide within the other. Thus, the slipping between the concentric pipes may serve to shorten or lengthen the distance between valve 13 and slip-joint 18, thereby putting either compressive or tensile forces on arms 15 and 17, controlling the speed of the tractor in relation to the line move as heretofore described.

The control of tractor speed in relation to the line move compensates for end drift in the same manner as heretofore described. The slippage distance preferably is equal to the lateral travel of the ends of levers 14a and 16a which operate valves 14 and 16. The slippage of one pipe within the other is sealed so that a minimum of water is lost thereby.

The hydraulic system is further illustrated in FIG. 4 wherein fluid, e.g., water from line 20a passes through reversing valve 3, then through motor 4 and line 12 to direction valve 13 which is positioned to cause the fluid to flow through throttle valve 14 to discharge. Direction valve 13 may be changed from one position to another by a timer, manual control or a post set in the ground at the end of the field to engage a lever attached to the valve which repositions direction valve 13 to cause it to function; the tractor and line move then moving in the opposite direction. The function of direction valve 13 is correlated with reversing valve 3. The degree to which valve 14 is open controls the speed of the tractor.

Thus, valves 14 or 16, depending upon the direction of travel, automatically and continuously match the speed of the tractor to that of the sprinkler line move. Additionally, the vertical offset of attachment points 15a and 17a from the levers operating valves 14 and 16 causes the tractor to adjust its speed so as to compensate for end drift of the line move towards or away from the tractor.

Upon reaching the end of the field, the system will either reverse itself and travel back across the field in the opposite direction, thus traveling back and forth over the field continuously, or shut itself off. The irrigation system can then be moved to another field, or allowed to remain inoperative until the field is to be irrigated again. Providing power to the system from a supply independent of the water supply permits the system to travel back across the field without sprinkling, thus always sprinkling the field while traveling in the same direction. As indicated hereinafter, a pneumatic prime moving system is especially adapted to this purpose and is further useful in that power can be stored in storage tanks 2c on the mobile towers and tractor of the irrigation system permitting the whole unit to be moved while disconnected from any stationary pipes or supply of power. In contrast, use of hydraulic power requires that the irrigating system be connected always to a water supply.

The valve cars or trucks 21 are illustrated in FIGS. 5 through 11. As illustrated in FIG. 1, each valve car is connected to the main central section of the tractor preferably by a pair of extensible hinged arms, although several sections of concentric, sliding tubular members may be utilized to contract and expand to move the valve car alternatively away from and towards the main central section of the tractor. The tractor is constructed so that when the front valve car is extended and attached to a riser, the rear valve car is in its fully extended position, or close to a fully extended position, will be attached to a riser spaced two risers away from the front valve car. When the hinged arms connecting the valve cars to the central portion of the tractor are in a contracted position, both valve cars are coupled to adjacent risers.

In FIG. 11, water line riser 26 containing check ball valve 27 is opened by rod and spider 29 when coupler pipe 30 is lowered to the coupling position by cylinder 33. Coupler pipe 30 is hinged at point 71 through arm 71a which is connected to cylinder 33. Check valve 32 maintains pressure in coupler pipe 30 at all times. Gasket 31 seals water leakage between coupler pipe 30 and riser 26.

FIG. 8 shows two-way valve 34, which controls coupling cylinder 33, in its normal spring loaded, that is, coupled, position. As the central rigid portion 20 of the tractor continues to approach valve car 21, it causes arm 22 to raise to a more vertical position as it pivots around its anchor bearing center pin 34a. This causes pin 35 to actuate lever 36a which is pivoted and spring loaded to the frame of car 21 in a downward motion, thereby shifting the spool of valve 34 to the uncoupling position where spring loaded latch 36 hooks over the spool collar 37 and holds the valve spool. Latch 39 and pin 38 perform the same function to advance a car forward when it is in the trailing position, that is, when it trails the central rigid section of the tractor as the tractor travels forward.

FIG. 9 shows the terminal member of arm 22a anchored to the opposite side of car 21. As arm 22a rises, lever 40 is positioned to shift the spool of valve 41. When valve 34, as illustrated in FIG. 8, actuates cylinder 33 (see FIG. 11), it raises coupler pipe 30, uncoupling it from the riser 26, and raises rod 42 which is attached to coupler pipe 30. This trips lever 40, causing it to push against collar 43 and shift valve 41, thereby allowing spring loaded latch 44 to drop behind collar 43 and hold valve 41 in the shifted position. Lever 45 performs the same function to advance a car forward when it is in a trailing position. Valve 41, now in an open position, thus actuates cylinder 23 and pushes the valve car to its maximum-extended position out ahead of the central portion of the tractor. Stop pins 40a and 45a prevent levers 40 and 45 from moving out of position.

Figure 6:
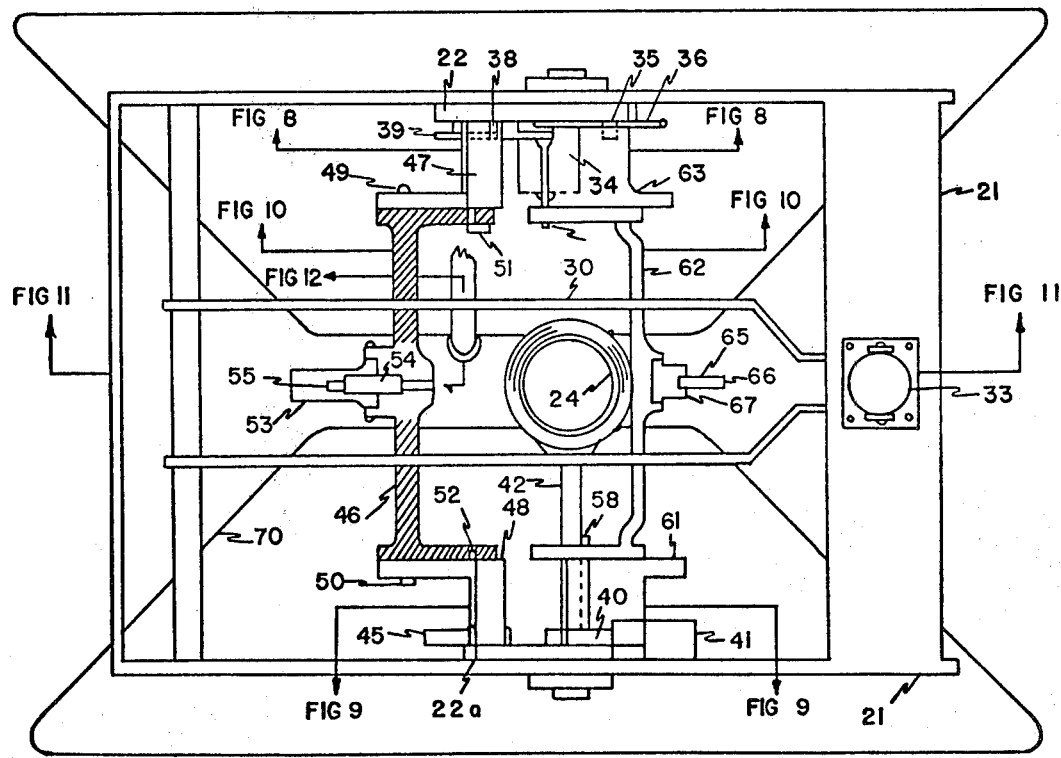
FIG. 6 is a plan view of a valve car.

FIGS. 10 and 6 show the stop assembly 46 mounted at the terminus of arms 22 and 22a by brackets 47 and 48, which are set out to clear the valve shifting mechanisms attached to arms 22 and 22a and shown in FIGS. 8 and 9.

Stop assembly 46 is pivotally anchored to brackets 47 and 48 at points 49 and 50, and is spring loaded against stops 51 and 52. Stop tongue 53 is hinged to stop assembly 46 and is normally retracted by spring 54. Cylinder 55 is actuated and extends stop tongue 53 when valve 41 actuates cylinder 23 (see FIG. 1) to an extended position.

When arm 22 is in an extended position, stop assembly 46 is rotated to the down sensing position and pad 56 is in a position to trip latch 36 (see FIG. 8) by means of latch trip lug 57, and on the opposite side of the car the companion pad 56 is in a position to trip latch lug 58 (see FIG. 9) on valve 41.

When tongue 53 on the advancing car contacts collar 60 (see FIG. 11) on riser 26, pads 56 trip valves 34 and 41 by means of trip lugs 57 and 58. Stop assembly 62 and components 65, 61, 63, 64, 66 and 67 function as described respectively for components 54, 51, 49, 56, 55, and 53 for stop assembly 46 to trip valves 34 and 41 when the car in the trailing position advances to the new valve. The rod anchor hole of advancing cylinders 23a and 23b (see FIG. 1) are elongated, preventing cylinders 23a and 23b from advancing pins 38 and 35 (see FIG. 8) where arm 39 and 36a would prevent valve 54 returning to its normal spring loaded position. When valve 34 is tripped, cylinder 33 again couples coupling pipe 30 to the new riser.

When valve 41 is tripped, it returns advancing cylinder 23 (see FIG. 1) to the float position and cylinder 55 (see FIG. 10) to the retracted position, thus completing a full cycle of operation.

Figure 12:
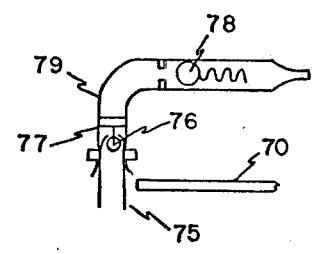
FIG. 12 is an elevational cross-sectional view of a pneumatic coupling unit.

The drive system of the tractor may be powered by compressed air, for example, from a main air supply line 70 (FIG. 1) laid parallel to the water supply line in which air risers 75 are provided (see FIG. 7). In FIGS. 7, 11 and 12 the air risers 75 may be placed adjacent to the water risers 26 (see FIG. 1), wherein each air riser has a check valve 76 (see FIG. 12) to prevent escape of air when no coupler is attached thereto.

Air coupler 79 (see FIGS. 11 and 12) is fastened to water coupler 30 (see FIG. 11) and consists of a spider and rod 77 (see FIG. 12) to open valve 76 when coupled and check valve 78 to prevent escape of air when uncoupled.

The compressed air/water system is schematically presented in FIG. 7. Water from main water supply line 25a passes through riser 26 and past check valve 32, which functions to retain water in the tractor system whenever the coupler pipe 30 (FIG. 11) is not coupled to a riser, through line 24 to the line move main sprinkler line 2. The sequencing of the various operations and propulsion of the tractor may also be accomplished by water pressure whenever valve 32a is open and valve 78a is closed allowing water to enter line 32b and into valves 34 and 41 and into cylinders 33, 23, 55 and 66.

Alternatively, valve 32a may be closed and valve 78a opened to control and propel the system. Compressed air then enters cylinder 33 through valve 34 to either couple or decouple the coupler pipe 30 with a riser 26. Compressed air enters cylinder 23a and 23b to extend or contract arms 22a and 22b, thereby propelling the tractor. Also, compressed air enters cylinders 55 and 65 through valve 41 to extend stop tongues 53 and 67 when valve 41 actuates cylinder 23 to an extended position.

In a pneumatically operated system, line 80 (see FIG. 4) is disconnected from the water-supply and connected to line 32b (see FIGS. 7 and 12). Line 32b (see FIG. 7) is disconnected from water line 25, i.e., valve 32a is closed, and pressurized air is supplied through compressed air riser 75 and check valve 78 to all cylinders, valves and motors, instead of water, which allows the sprinkler to move without watering when the water supply is shut off.

Several variations of the invention thus far described may be readily practiced, for example, the main water supply line may be laid on top of the ground and the tractor and valve cars can be made to ride the pipe and use it for a guide, thus eliminating the steering system for the tractor. Alternatively, the compressed air line may be used as a rigid guide wherein the steering mechanism of the tractor would be responsive to the guide.

Provision of a pneumatically driven tractor provides the advantage that the water can be turned off and the tractor permitted to reverse itself and travel on through the field without watering it. Also, the line move may store enough compressed air in storage tanks on each tower to permit the line move to be entirely disconnected from the tractor and rotated around a tractor which is symmetrical about its longitudinal axis and reconnected on the opposite side of the tractor so that a single tractor and line move operating on a main water supply line laid in the center of an elongated field may water the entire field by traveling down one side of the main water supply, rotating around or traversing the end of the water supply and then traveling in a reverse direction up the field on the opposite side of the water supply line. A line move may be caused to rotate about the end of the water supply, or it may be moved lengthwise inasmuch as many line moves are made with tires which pivot 90° so that the line move may travel in a direction perpendicular to its length or travel along a line projected along its length.

A further modification of the invention described utilizes the risers as anchors wherein cylinder 23a and 23b can then be made to push and pull the central rigid section of the tractor as well as advance the coupling cars, thus eliminating a motor drive mechanism in the tractor.

Figure 13:
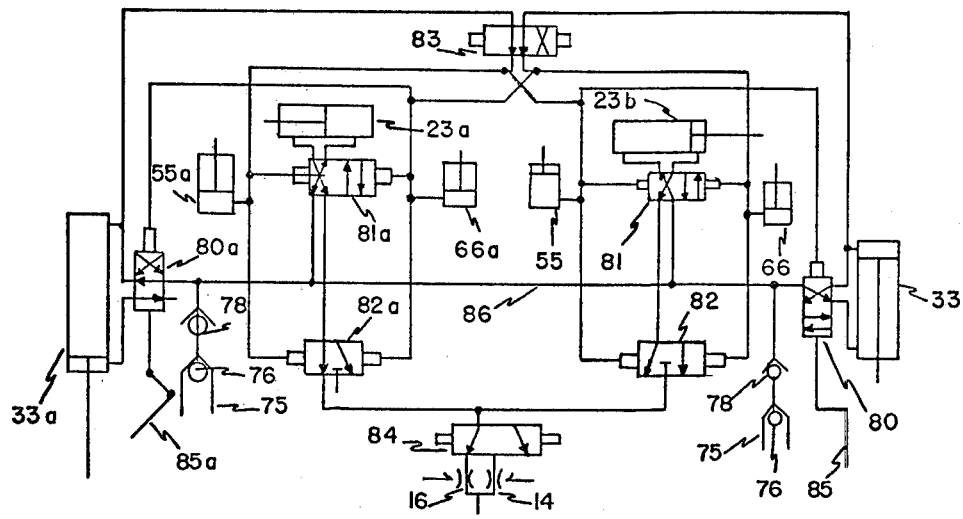
FIG. 13 is a schematic of the sprinkling system illustrated in FIG. 1 wherein the valve car advancing cylinders are used to propel the tractor.

FIG. 13 is a schematic representation of apparatus for which sprinkler movements may be hydraulically or pneumatically sequenced instead of mechanically sequenced, as previously described, and the valve car advancing cylinders 23a and 23b may be used to propel the tractor. FIGS. 1, 5, 10, 11, 12 and 15 are applicable to this system also. FIGS. 2 and 3 are also applicable, except that no driving mechanism, motor or controls are required.

Figure 5:
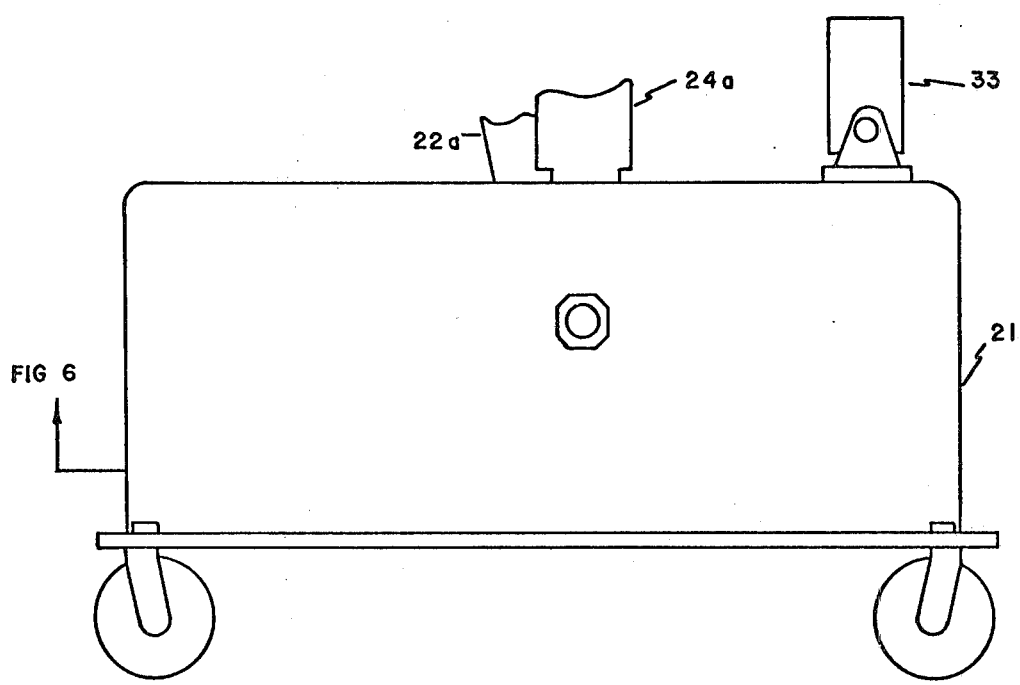
FIG. 5 is an elevation view of a valve car.

If the wheels on the tractor shown in FIGS. 1, 2 and 3 and on the valve cars shown in FIGS. 1, 5 and 11 are spaced in position so that they will ride the top half of an above-ground main line pipe (see FIG. 16) to which the risers 26 and 75 (see FIG. 1 and 11) are attached, the coupler can use the pipe as a guide or base line, and the steering mechanism and motor drive shown in FIGS. 2, 3 and 4 can be eliminated.

Figure 16:
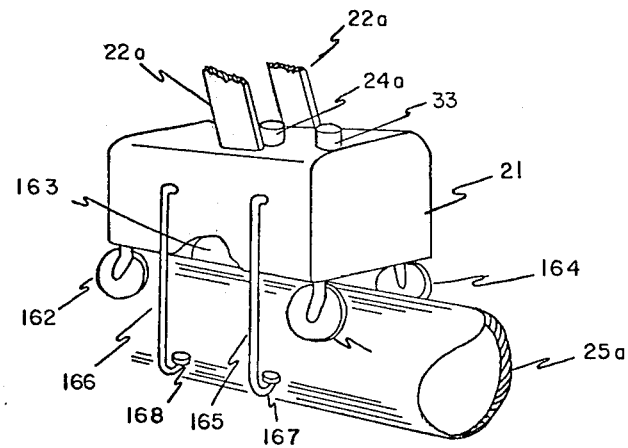
FIG. 16 illustrates a valve car riding up on a main water pipe.

FIG. 16 illustrates a valve car 21 riding the main water supply pipe 25a, which is frequently a pipe having a diameter of six to twelve inches or more. The valve car illustrated has four wheels 161, 162, 163 and 164 which ride the upper half of the pipe. Since it is preferred to space the wheels as far apart as possible the lateral wheel spacing is preferably about 80% of the outside pipe diameter. In the embodiment shown in FIG. 16, stabilizer arms 165 and 166 (and a pair on the opposite side of the car) having spherical rollers 167 and 168 in contact with the lower half of the pipe prevent the valve car from being easily dislodged from the pipe.

There are a number of advantages to this arrangement inasmuch as wheels rolling along the ground can encounter rocks or other obstacles and cause the tractor to be jarred off course or to cause the valve car to be unduly elevated when a coupling operation to a riser was in progress. Although the wheels are relatively close together on a tractor riding a pipe, the line move coupled thereto provides an outrigger which stabilizes and steadies the tractor. The end drift or end thrust correction mechanism prevents the tractor from being easily overturned. Also, guide wheels may be located to ride along the lower side of the pipe.

FIG. 13 schematically illustrates the sprinkler as positioned in FIG. 1, that is, the front valve car 21 is reaching for a new riser (traveling to the right) while the rear valve car is connected to the rear riser, supplying water and/or pneumatic power for propelling the tractor and watering the field. Cantilever cylinder 23a is pushing the tractor by water or air supplied through valve 81a from pressure line 86. Travel speed is controlled by valve 16 throttling the exhaust (rod end) of 23a through central valves 81a, 82a and 84.

When the shift lever 85 contacts the riser, it automatically overrides the pilot pressure and shifts valve 80 to the up position causing cylinder 33 to couple to the pneumatic and/or water supply previously described. Pressure from the head end of cylinder 33 travels through reversing valve 83 and first shifts valve 80a, which has been held in position by detents to the lowered position which shifts cylinder 33 and uncouples rear valve car from risers. Also it shifts valve 81, directing pressure to the rod end of cylinder 23b causing it to pull the tractor's central section, then it shifts valve 82, diverting exhaust from cylinder 23b through 84 and speed throttling valve 16, which controls the rate of travel. Valve 81a is then shifted (directing pressure to rod end of 23a) and directing exhaust from 23a to valve 82a. Valve 82a is then shifted, blocking line to 84 and exhausting head end of 23a thereby causing the rear cantilever arms to quickly retract.

The tractor continues to be pulled along at a controlled rate by cylinder 23b until shift lever 85a contacts the riser, actuating cylinder 33a through 80a, coupling rear valve car to riser, shifting all valves to start a new cycle. When the sprinkler reaches the end of the field, a stop shifts valves 83 and 84, reversing the unit and causing it to travel back across the field as previously described.

Control and sequencing of the movements of the coupler mechanism can be accomplished by the use of hydraulic or pneumatic valve arrangements instead of mechanical sequencing. Off-the-shelf components can be generally more readily utilized for hydraulic or pneumatic control and the unit is generally more dependable. FIGS. 1, 5, 10, 11 and 12, 15 and 16 are applicable to this version of the invention. FIGS. 2 and 3 are also applicable, except that valve 3 (see FIG. 3) is replaced by valves 92, 94 and 95 (see FIG. 14). FIG. 15 shows the location of valve 80 and shift lever 85. Valves 90 and 91 (see FIG. 14) can be physically located in a convenient place on the valve car and cantilever arm.

The wheels on the tractor shown in FIGS. 1, 2 and 3 and on the valve car shown in FIGS. 1, 5 and 11 are spaced and positioned so that they will ride the top half of an above-ground pipe to which the risers are attached, the coupler will use the pipe as a base line and guide and the steering mechanism shown in FIGS. 2, 3, 4 and 14 can be eliminated.

FIG. 14 schematically illustrates the coupler shown in FIG. 1. The rear valve car is connected to the left hand (rear) riser and is supplying water to the sprinkler and air or water to operate the coupler. The front valve car is disconnected and reaching out for a riser. Travel illustrated in the diagram is to the right.

Riser and check valves 75a are supplying air through coupler check valve 78a to air supply line 86. If water is used for propulsion, supply line 86 would then be connected to line 24, shown by the dotted lines, and valves 75, 75a, 78 and 78a could be eliminated.

Motor 4 is propelling the coupler through a gear train. Hydraulic or pneumatic power is supplied through reversing valve 95 and stop valve 94.

Lever 53 (FIG. 15) contacts the riser, actuating lever 85 which shifts valve 80 (FIG. 15), causing cylinder 33 to couple to the water and/or pneumatic riser, resulting in pressure on the head end of cylinder 33, which shifts valve 80a (raising cantilever arms which relieves shift lever 85a from its actuated position, and valve 80a which has been held in position by detents) and decouples the rear valve car.

Pressure on the rod end of cylinder 33a is transmitted through directional valve 90a and shifts valve 91a to the right, causing cylinder 23a to quickly retract the rear valve car. At the same time, valve 80, exhausting the rod end of cylinder 33, relieves the pilot pressure on valve 91. Having no pilot pressure on either end of valve 91, it spring centers to vent both ends of cylinder 23 to the atmosphere and allow cylinder 23 to float, applying no pressure to the front valve car. Motor 4 continues to move the coupler forward at a speed controlled by valve 16 as previously described. When shift lever 85a contacts the riser, it shifts valve 80a, cylinder 33a couples the car to the riser, cylinder 33 decouples, cylinder 23 extends the front valve car forward. Cylinder 23a shifts to neutral and motor 4 continues to propel the coupler forward with either water and/or air again being supplied by the rear coupler. When the sprinkler reaches the end of the field, a stop set in the ground either shifts valve 94, stopping the sprinkler travel, or shifts valve 92, which pressurizes the pilots of 13 and 95, and overrides the shifting springs and reverses the drive motor through valve 95, and shifts speed control to valve 14 through 13, and reverses the action of the cantilever cylinders 23 and 23a by shifting valve 91 and 91a, by shifting directional valves 90 and 90a, causing all functions to reverse and the sprinkler to travel back across the field. The sprinkler can either irrigate the field as it travels in reverse or, if air driven, can return to the left hand end of the field without watering and only water while traveling in one direction.

The self-propelled linear irrigation system described herein has numerous advantages. The system is self-correcting and steers a straight course. Also, the system does not require a fuel or electrical prime mover attached to the tractor or mobile towers, but can be propelled by water pressure or alternatively, compressed air, whereby air storage cylinders attached to the tractor and mobile towers permits the system to be propelled temporarily without attachment to any source of energy, thus enabling the line move, for example, to be moved from one side a centrally laid main water supply pipe to the other.

A further advantage of the instant irrigation system is its ability to automatically couple and decouple with water pipe risers to supply a continuous, uninterrupted supply of water to the field. The system may provide a tractor which rides the main water supply pipe and even propel itself by using the water pipe risers as anchoring points. Additionally, the system is capable of guiding upon the main water supply pipe without requiring separate or additional guide references.

Although the invention has been described by reference to specific embodiments, it is to be understood that it is not intended to be limited thereto but to include all the variation and modifications within the scope of the appended claims.

I claim:

1. A method of irrigating a field having a water supply line with spaced outlets traversing said field comprising:
    (a) connecting first coupler means of a first extensible arm to a first outlet on said water supply line;
    (b) advancing a line move lateral connected to said first extensible arm away from said first outlet until said line move lateral is substantially adjacent a second outlet in said water supply line;
    (c) extending a second extensible arm connected to said line move lateral to advance a second coupler attached to the end of said second arm to a point approximate a third outlet which is forward of said first and second outlets and coupling said second coupler thereto;
    (d) releasing said first coupler from said first outlet;
    (e) advancing said line move lateral to a point approximately half way between said second and third outlets;
    (f) retracting said first extensible arm until said first coupler attached thereto is proximate said second outlet and coupling said first coupler thereto;
    (g) decoupling said second coupler, extending said second extensible arm and advancing said line move lateral.

2. The method of claim 1 wherein said first and second extensible arms extend and retract in a substantially vertical plane.

3. The method of claim 1 wherein said first and second extensible arms are substantially aligned.

4. The apparatus of claim 1 wherein said first and second extensible arms each extend and retract in scissors fashion.

* * * * *